April 11, 1950     A. E. KROWS     2,503,277
DISSOLVING SLIDE FILM PROJECTOR

Filed March 4, 1946     3 Sheets-Sheet 1

INVENTOR
ARTHUR E. KROWS
BY
ATTORNEY.

April 11, 1950 A. E. KROWS 2,503,277
DISSOLVING SLIDE FILM PROJECTOR
Filed March 4, 1946 3 Sheets-Sheet 2
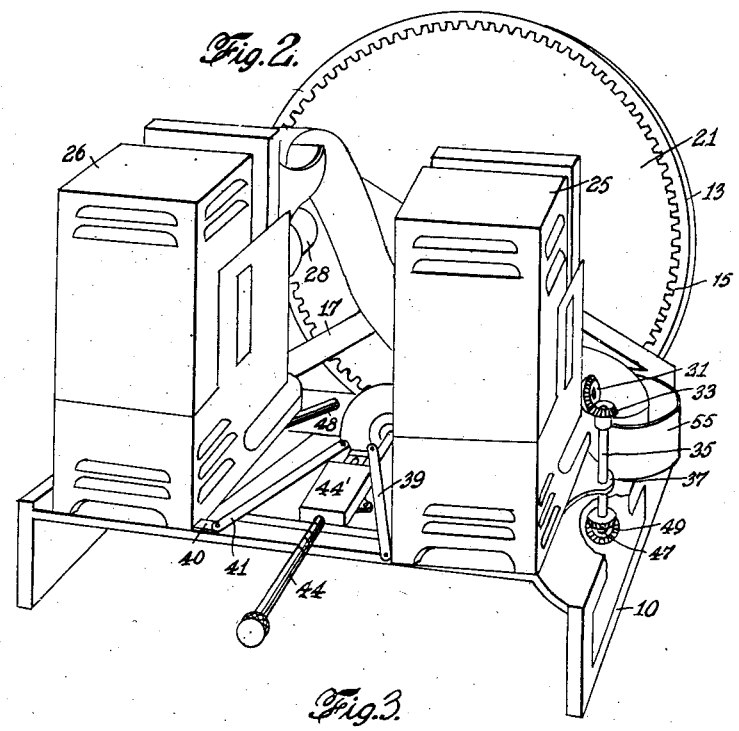
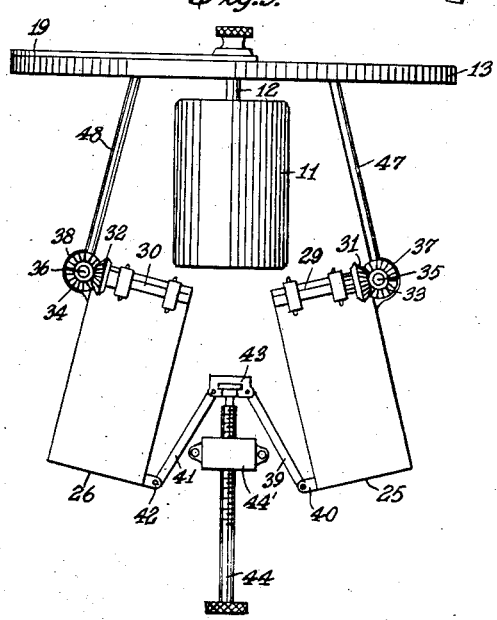
INVENTOR
ARTHUR E. KROWS
BY
ATTORNEY

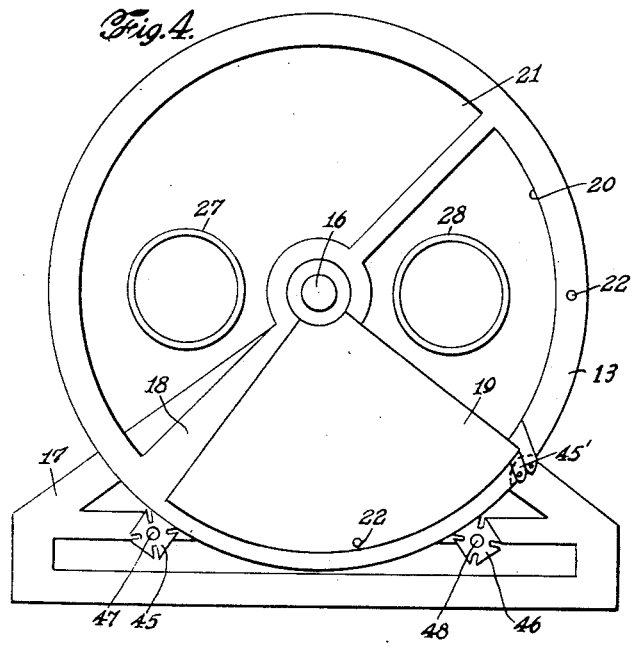
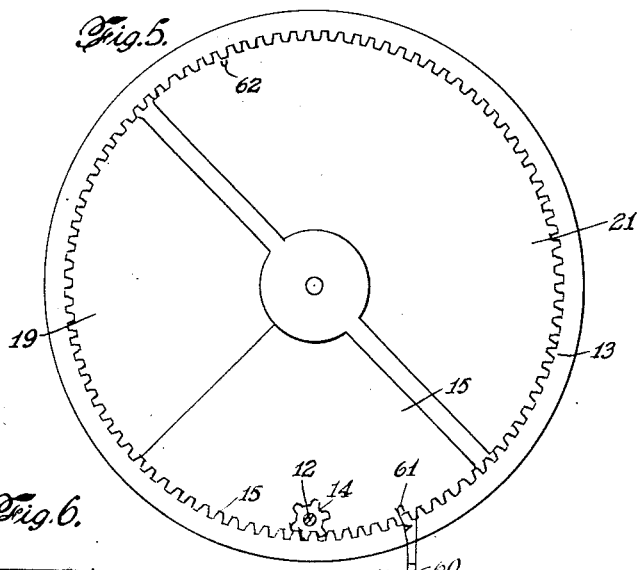
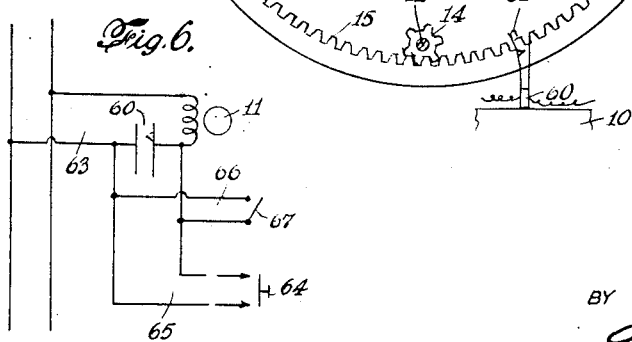

Patented Apr. 11, 1950

2,503,277

UNITED STATES PATENT OFFICE 2,503,277

DISSOLVING SLIDE FILM PROJECTOR

Arthur E. Krows, Hastings on Hudson, N. Y.

Application March 4, 1946, Serial No. 651,910

4 Claims. (Cl. 88—28)

The invention relates to stereopticon devices of the nature known as slide film or film strip projectors utilizing a continuous strip of film, or a pair of identical films, having successive frames depicting the matter to be exhibited, and more especially to devices embodying the dissolving or lap-fading system and comprising two projectors, such as the arrangement set forth in my copending application, Serial No. 523,822, which has matured into Patent No. 2,395,883 dated March 5, 1946.

An object of the present invention is to provide a novel drive arrangement for the alternate operation of the respective projectors.

Another object of the invention is to effect an intermittent advance of film from the operation of a shutter common to both projectors.

Still another object of the invention is to provide a simple mounting for the two projectors whereby to enable adjustment for parallax.

A further object of the invention is to provide a novel construction of shutter whereby to allow temporarily of projecting upon a screen simultaneously from both lenses of the respective projectors, as in focusing and parallax adjustment.

A still further object of the invention is to provide means whereby the rotation of the shutter is interrupted automatically; also, means whereby rotation may be restored, as by the operator or a lecturer.

The invention has for an object, also, to provide novel film retaining means for the film and to facilitate its threading in the apparatus for service, as well as removal therefrom.

In carrying out the purposes of the invention, a pair of projectors, for a single or for a pair of film strips, are mounted independently of each other and adjacently, with their respective lens systems directed generally toward a common point on a screen so that the images thereby projected may be superimposed at a common portion of the screen when the respective systems are accordingly adjusted. Such adjustment is effected by so mounting each of the projectors as to be adjustable about a like driving element for the two film advancing means of the corresponding projectors.

These driving elements derive their rotation alternately from the rotation of a dissolve type of shutter common to the two optical systems of the respective projectors, the shutter in turn being rotated, preferably, from a suitable motor through intermediate transmission mechanism.

The said shutter, moreover, in the case of a motor drive, may have associated therewith means for interrupting automatically the rotation of said motor after dissolving in a picture; and the period that such picture may be viewed on the screen may be controlled manually or automatically in accordance with restoration of motor operation. Or, if desired, the shutter rotation may be effected directly by manual operation and correspondingly controlled. The period of projection of the same subject may be prolonged, also, by duplicating the subject on the film strip or strips to the required extent.

In the use of a pair of film strips, these must be constituted as duplicate prints and they are to be separately threaded into the respective projectors—the pictures of one film strip being arranged therein in advance of those of the associated strip or out of step for alternate projection; while with a single strip of film alternate pictures to be displayed are arranged out of numerical order thereon in a manner similar to that disclosed, for example, in my said prior application. Such film, also, may be threaded in a novel manner in the projectors to facilitate transfer from one projector to its companion projector.

Provision is made in connection with the shutter whereby its normal function, of affording a brief blending or dissolve of an outgoing image with the incoming one to cause but a single image to appear on the screen, is suspended; and the shutter, at rest, is arranged to have a sector of its obscuring portion angularly adjustable to position over the remainder of the obscuring portion so that both optical systems may be caused to project images simultaneously, as for testing and proper adjustment of focus and parallax.

The nature of the invention, however, will best be understood when described in connection with the accompanying drawings, in which:

Fig. 2 is a similar view of the rear of the apparatus.

Fig. 3 is a fragmentary plan of the adjustment means for the respective projectors, and also a portion of the driving mechanism for operation of the apparatus.

Fig. 4 is a front elevation of the projection apparatus.

Fig. 5 is a rear elevation of the shutter and contact mechanism associated therewith; and Fig. 6 is a diagrammatic view of the control circuit for the shutter motor.

Figure 1:
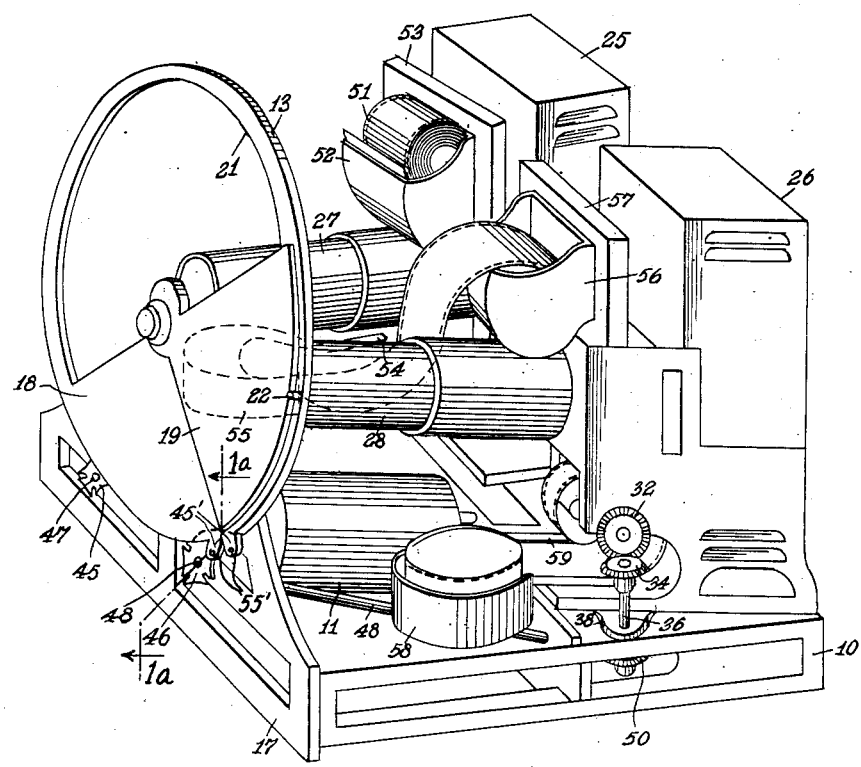
Fig. 1 is a front view, in isometric projection, of the novel projection apparatus.
Figure 1A:
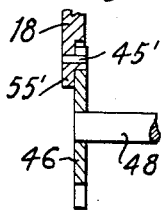
Fig. 1a is a fragmentary transverse section on an enlarged scale, taken on the line 1a—1a, Fig. 1 of the drawings, and looking in the direction of the arrows.

Referring to the drawings, 10 designates a suitable base or support for the various elements of the novel slide film projector, operation of the same being, preferably, from an electric motor 11 secured to the base. Operation, however, may be effected manually, if desired, by means of a suitable crank handle connection (not shown) to the drive shaft 12 of the motor.

A convenient speed reduction is afforded by transmitting the motor rotation to the shutter 13 of the projector as by means of a pinion 14 of the drive shaft engaging an internal annular gear 15 attached to the circular frame of said shutter. If required, further speed reducing mechanism (not shown) may be introduced between the drive shaft and pinion, as is well understood. The shutter 13 is of the semi-circular, dissolve-disk type and is mounted for rotation on a hub 16 of a vertically disposed bracket 17 extending upwardly from the base 10 at its forward portion. The usual approximately semi-circular obscuring portion of the said shutter, however, instead of being constituting as a continuous or one-piece section is divided into a fixed section or approximate quadrant 18 and a movable quadrant or sector 19. The latter section 19 is mounted for angular movement on the hub 16 over the face of the section 18 to afford thereby an opening 20 (indicated in Fig. 4) additional to the customary semi-circular image passing opening 21 of the shutter. Sector 19 may be suitably held in its different locations, for example, by means of a snap fastener 22 or the like.

Such adjustment of the sector becomes desirable in the case of the instant invention which requires the use of two independent or duplex projectors such as the projectors 25 and 26, also mounted on the base 10 and each embodying the usual lamp, lamp-house, projection aperture element, and an optical or lens system for projection of images alternately from a film strip or strips. The optical axes of the two lens systems are situated approximately in a plane which includes also the axis of rotation of the shutter 13. By displacing sector 19 over the section 18, the opening 20 facilitates the usual adjustment for focus for said projectors and also parallax adjustment, the manner of effecting the latter adjustment being hereinafter more fully set forth and operates without disturbing the driving mechanism.

In the embodiment shown, 27 and 28 designate the optical systems of the respective projectors 25 and 26 which are designed to project alternately respective images upon a screen (not shown) at a common portion thereof so that these images will be superimposed—the general principle of all of which is well understood in the art, and no claim is made to the broad features thereof. However, the apparatus embodies novel means for effecting the transmission of rotation from the motor 11 to the film advancing mechanism of each projector, whereby also the necessary angular adjustment of the projectors with respect to each other is permitted and accomplished in a simple and satisfactory manner.

The film advancing means in each projector comprises the customary take-up sprocket 29 and the sprocket 30 which also feed the film forward, said sprockets having a bevel gear 31 and a bevel gear 32 respectively connected therewith externally of the respective projector casings. These gears, in turn, mesh with corresponding bevel gears 33 and 34 of sprocket driving shafts 35 and 36 respectively mounted for rotation in base 10. The said shafts 35, 36 pass freely through respective ears 37 and 38 extending laterally from the forward outer corners of the bases of said projectors 25, 26 which rest upon the base 10.

By this expedient, each of the projectors may be rocked about the corresponding sprocket drive shaft to afford simultaneously a limited converging or diverging angular adjustment of the two optical systems of said projectors for registering the projected images in accordance with the distance of a screen from the apparatus.

This adjustment may be conveniently effected by introducing, for example, a linkage mechanism pivoted to the respective corners of the projectors diagonally opposite their ears 37, 38. Thus, a link 39 is connected at its one end to a further ear 40 and a link 41 to an ear 42 respectively extending laterally from the bottoms of projectors 25 and 26. At their respective opposite ends, links 39 and 41 are pivoted to a control member as the block 43 which is reciprocably mounted upon the base 10 for movement in a direction normal to the plane of rotation of shutter 13 and toward and away from the same to diverge or converge respectively the said lens systems. This movement may be effected by manually rotating the end of a rod 44, threaded through a fixed block 44′, and whose headed inner end rotates freely in block 43, the longitudinal axis of the rod and the axis of rotation of shutter 13 lying in a common plane. Such adjustment has no effect upon the rotation transmission from shutter 13, as the projectors swing about the corresponding sprocket drive shafts 35, 36.

The transmission of rotational movement from motor 11 to said sprocket drive shafts 35, 36 is accomplished in a novel manner from the rotation imparted to the shutter 13. The shutter to this end constitutes the vertical drive element of a double Geneva movement—one being provided for each of the projectors. Thus, in addition to its periphery riding in the star wheels 45 and 46, which are rotatably mounted in bracket 17 immediately below the shutter, the latter is provided with an engaging element such as a pair of ears 55′ projecting outwardly from the circumference and bearing corresponding teeth 45′ to engage in respective slots of the corresponding star wheel for drawing through a corresponding projector two frames as each of the star wheels is actuated. These star wheels are displaced angularly an extent to insure proper timing with reference to the shutter travel; and said wheels must be so located that neither will cause movement of a film portion at a time to reveal such action on a screen. The intermittent motion thus imparted to the respective star wheels is communicated to the corresponding sprocket drive shafts 35, 36 through shafts 47, 48 on which the star wheels are mounted, these shafts in turn imparting movement through pairs of bevel gears 49 and 50 to the respective sprocket drive shafts 35 and 36. This movement thus brings a picture frame into position only when the shutter intercepts its projection. When these shafts 47 and 48 are not located parallel to the axis of rotation of the shutter, as indicated in the embodiment of the invention illustrated in the drawings, the contour of the holding portions of the respective star wheels will be made to conform so as to engage properly the edge of the shutter.

Either a single film strip threaded through both projectors may be utilized, or separate but duplicate film strips for the respective projectors may be utilized in the novel apparatus. In the case of a single film strip, as indicated in the drawings, the strip is loaded as a roll 51 in a supporting cup 52 of the projector 25, and its free end is threaded through an aperture or gate member 53, then passed over the sprocket 29 and guided from a guideway 54 into an open-top cup 55, thence in a long free loop obliquely upward and through a second supply cup 56 of projector 26. From this point it is directed again downwardly through the aperture gate member 57 of said projector 26, over the sprocket 30 and guided ultimately to a take-up cup 58 through a guideway 59 extending therefrom toward the sprocket.

When the novel apparatus is motor driven, provision may be made, for interrupting automatically for the desired exhibition period the motor operation as soon as an image is presented on a screen. For example, a spring switch 60 is then mounted on the base 10 behind the shutter and one member thereof is adapted to be contacted successively by two diametrically disposed projections 61 and 62 extending inwardly from the inner face of said shutter to open the switch. This interrupts the power circuit 63 to the motor 11, and an image projected by one of the optical systems will remain on the screen until power is again applied to the motor to re-establish its rotation.

To re-establish the rotation, a manually controllable switch or push button 64, for example, may to this end be included in a circuit 65 bypassing the switch 60, but, when the other of the interrupting projections 61, 62 arrives at the switch 60, the motor will again cease to function with the next image projected. If it is desired to eliminate this action of the projections on the motor operation, the switch 64 may be arranged to remain permanently closed, or a separate bypassing circuit 66 with switch 67 may be provided for this purpose.

I claim:

1. In slide film projection apparatus for projecting at adjustable distances a succession of images upon a common field: the combination with a pair of projectors mounted for angular adjustment and having independent optical systems and a film-engaging means for each system to advance film with respect to the corresponding optical system for projection of images thereby; of a single dissolve disk shutter common to the two said optical systems to interrupt alternately said image projections from the corresponding optical systems; means to rotate said shutter continuously; a pair of Geneva movement star wheels angularly disposed about the shutter rotational axis upon opposite sides thereof and rotatable substantially in the rotational plane of said shutter, together with means rotatable synchronously with the shutter adapted for consecutive engagement with said star wheels; transmission mechanism intermediate to each of the said star wheels and the corresponding film engaging means; and means connected with the respective projectors to adjust angularly equally the same simultaneously in a plane parallel to said shutter rotational axis.

2. Slide film projection apparatus according to claim 1, wherein each projector is provided with an ear perforated in the axis of a shaft of its transmission mechanism extending at right angles to the shutter rotational axis, the projectors being mounted through the corresponding ears for angular movement about the respective axes, and a reciprocable means is connected through respective links with the corresponding projectors for effecting the simultaneous angular movement thereof.

3. Slide film projection apparatus according to claim 1, wherein the means rotatable synchronously with the shutter comprises a toothed member which is provided substantially at the circumference of the shutter to extend therefrom for engagement successively with the star wheels.

4. In slide film projection apparatus: a pair of projectors having independent optical systems, and a film-engaging means for each system to advance film with respect to the corresponding optical system for projection of images thereby; a single dissolve disk shutter common to the two said optical systems to interrupt alternately said image projections from the corresponding optical systems; means to rotate said shutter continuously; a pair of Geneva movement star wheels angularly disposed about the shutter rotational axis upon opposite sides thereof and rotatable substantially in the rotational plane of said shutter, together with means rotatable synchronously with the shutter for consecutive engagement with said star wheels; and transmission mechanism intermediate to each of the said star wheels and the corresponding film-engaging means.

ARTHUR E. KROWS.

REFERENCES CITED

The following references are of record in the file of this patent:

UNITED STATES PATENTS

| Number | Name | Date |
|---|---|---|
| 366,823 | Perry | July 19, 1887 |
| 552,246 | Haarstick | Dec. 31, 1895 |
| 904,212 | Moran | Nov. 17, 1908 |
| 995,061 | Duhem | June 13, 1911 |
| 1,070,992 | Schulhoff | Aug. 19, 1913 |
| 1,247,646 | Craig | Nov. 27, 1917 |
| 1,378,462 | Jenkins | May 17, 1921 |
| 1,658,361 | Tessier | Feb. 7, 1928 |
| 1,753,622 | Owens | Apr. 8, 1930 |
| 2,299,973 | Getten | Oct. 27, 1942 |
| 2,301,274 | Greiser | Nov. 10, 1942 |

FOREIGN PATENTS

| Number | Country | Date |
|---|---|---|
| 594,546 | France | Sept. 14, 1925 |
| 434,711 | Germany | Oct. 1, 1926 |
| 737,242 | France | Dec. 8, 1932 |